UNITED STATES PATENT OFFICE.

GUY DE BECHI, OF LONDON, ENGLAND, ASSIGNOR OF ONE-HALF TO REGINALD WYNN RUCKER, OF LONDON, ENGLAND.

TREATMENT OF COMPLEX SULFID ORES.

No. 880,775.     Specification of Letters Patent.     Patented March 3, 1908.

Application filed April 9, 1907. Serial No. 367,271.

*To all whom it may concern:*

Be it known that GUY DE BECHI, a subject of the King of Italy, residing at 36 Upper Marylebone street, in the county of London, England, chemical engineer, consulting and analytical chemist, has invented certain new and useful Improvements Relating to the Treatment of Complex Sulfid Ores, of which the following is a specification.

This invention relates to the treatment of complex sulfid ores, and particularly of complex zinc bearing ores, as for example the ores from the Australian Broken Hill deposits the object being to effect the separation of the lead zinc in the first stage of the process in such a manner that the lead remains in the insoluble form and the whole of the zinc is obtained in the form of zinc sulfate; the said metals being thus rendered in condition for metallurgical treatment in the known manner.

Heretofore considerable difficulty has been experienced in treating such ores for effecting the extraction of the metals therefrom, owing to the intimate mixture of the constituents which consist chiefly of zinc blende and galena, and to the difficulty of a complete extraction of the zinc by a wet process which will cleanly separate this metal from the other constituents of the ore.

The present invention is designed to separate the lead from the zinc by a wet process, whereby each metal is obtained in a compound of such purity as to render the final metallurgical treatment a matter of common knowledge, this result being obtained by chemical means entirely, without the aid of electricity.

I am aware that other methods of a somewhat similar character have been proposed for solving this problem; but there are reasons in each case which prevent success. For example, I may mention the process of Siemens and Halske, which however is chiefly based on the use of electricity, and that of MacArthur and Forrest which aims at dissolving all the metallic constituents of the ore, the metals being subsequently separated in solution. My process, however, aims at dissolving the zinc only so as to separate it easily and in a practical manner from the other constituents of the ore.

According to this invention, the ore is first very finely ground or pulverized preferably to an impalpable powder and in this condition may be heated to ebullition with an acid solution of ferric sulfate, the free acid being only necessary for the subsequent regeneration of the ferric solution as herein after described. The reaction is rendered complete by subjecting the ore to an excessively fine grinding, and under certain conditions it may be advisable to heat under pressure so as to expedite the chemical action. Thus, if ferric sulfate be used for leaching, the zinc is rendered soluble as zinc sulfate, while the sulfur remains with the insoluble residue, as free sulfur; the following equation representing what is believed to be the chemical reaction:—

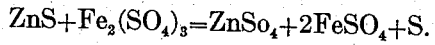

$$ZnS + Fe_2(SO_4)_3 = ZnSO_4 + 2FeSO_4 + S.$$

The solution which is free from lead is then filtered, the insoluble residue—containing all the lead compounds, sulfur and gangue matter—being dried and heated in a closed vessel so as to recover the sulfur by distillation, after which the remainder of the residue may be treated for the extraction of the lead in the usual way. The filtrate or solution, which contains the zinc as soluble zinc sulfate quite free from lead and the iron chiefly as ferrous sulfate, if allowed to cool, would yield crystals of zinc-iron sulfate. To avoid the crystallizing of the iron salt with the zinc salt, the solution is then treated in such a manner as to convert the ferrous sulfate into ferric sulfate, and for this purpose nitric acid may be employed, the nitrous fumes evolved being transformed, by any well known means into nitric acid which may thus be used repeatedly. The solution thus treated contains only the ferric sulfate together with the zinc sulfate formed during the leaching, and, by suitably cooling only, the zinc salt alone may be separated out as zinc sulfate crystals; the ferric sulfate being much more soluble than the zinc sulfate remains in the mother-liquor. The zinc sulfate crystals may be dried and calcined in a muffle furnace; the acid fumes given off or resulting from such treatment, being caused to pass into and be absorbed either by the ferric sulfate solution from which the zinc sulfate crystals have separated out, or by water so as to condense said fumes to sulfuric acid. The ferric sulfate solution which has absorbed the fumes evolved from the calcining of the zinc sulfate, may then be used to leach a fresh quantity of ground ore. The resultant compound obtained from the calcining of the zinc sulfate will be found to consist of nearly pure zinc oxid which may be converted into pure spelter free from lead for use in the arts or be subjected to further treatment if desired.

The foregoing process for extracting and separating the zinc from lead and zinc bearing ores requires in theory no other raw materials than ore, coal and fluxes for the lead smelting, and the process is a cyclical one. In practice however, nitrate of soda in small quantities must be used to make good the inevitable mechanical losses in regenerating the ferric sulfate solution. The result attained is a nearly complete and clean separation of zinc and lead in the form of compounds suitable for further metallurgical treatment without the use of extraneous reagents. As regards the other metals which may be present in the treated ore, namely, copper, silver, and gold, these remain chiefly with the lead residue and are recovered by the lead smelting, the copper being recovered as matte, and the silver and gold as alloys with the lead as is usual. When the ore contains metals such as iron or manganese these may be dissolved and transformed into soluble sulfates by the ferric sulfate. Under such circumstances the amount of iron contained in the reagent continually increases until some of the solution has to be thrown away, or must be purified from the excess of iron. The best manner of purification consists in the precipitating of the iron as ferric hydrate or insoluble basic sulfate by the zinc oxid obtained from a previous operation; this precipitation of excess of iron can be done at regular intervals so as to eliminate the iron which is dissolved from the ore. An appropriate quantity of the liquid is therefore boiled with a milk of zinc oxid obtained from a previous operation, the zinc oxid thus displacing the iron and going into solution as sulfate; the excess of iron, as ferric hydrate or basic insoluble ferric sulfate, is separated by filtration in the well known manner and the liquid is returned to the process. The ferric compound thus removed can be sold as iron ore, converted into ocher or other marketable iron compounds, or can go to the lead smelting department to supply the iron for the slag.

As regards the manganese, it is first transformed into sulfate which goes into solution till the latter becomes saturated with manganese; when this point is reached, no more sulfate of manganese is dissolved by boiling, because the sulfate of manganese is more soluble at a moderate temperature than at boiling point; for the same reason such solutions do not give crystals of mixed manganese sulfate and zinc sulfate by cooling. Therefore, all the manganese sulfate formed, remains, after a certain number of operations, with the lead and silica residue; if it is desired to produce manganese compounds in a commercially pure state, this residue is first washed on the filter with a saturated solution of manganese sulfate; obtained from a previous operation to displace the mother liquor impregnating the residue, and is then treated with water, which dissolves only the manganese sulfate; the solution so obtained can be evaporated to solid manganese sulfate; or manganese oxid can be produced by calcining the sulfate. By these methods of purification of the liquids, the zinc sulfate obtained by the process crystallizes out in a commerically pure condition, giving by subsequent calcination pure zinc oxid and pure spelter by re-torting.

What I claim and desire to secure by Letters Patent of the United States is:—

1. A cyclical process for treating complex sulfid ores containing lead and zinc consisting in grinding or pulverizing the ore to the condition of an impalpable powder, treating the same with a solution of ferric sulfate, filtering the solution of ferrous sulfate and zinc sulfate so formed from the insoluble lead residue, converting the ferrous sulfate to ferric sulfate by oxidation and subjecting them to acid fumes evolved from the calcination of the zinc sulfate obtained from a previous operation, crystallizing out the zinc sulfate and separating the same from the ferric sulfate solution, calcining the zinc sulfate, subjecting the zinc and lead compounds separately to the usual metallurgical treatment and using the regenerated ferric solution for the treatment of a further quantity of ore.

2. A cyclical process for treating complex sulfid ores containing lead and zinc consisting in grinding or pulverizing the ore to the condition of impalpable powder, treating the same with a solution of ferric sulfate, filtering the solution of ferrous sulfate and zinc sulfate so formed from the insoluble lead residue, converting the ferrous sulfate to ferric sulfate by oxidation aided by sulfuric acid, crystallizing out the zinc sulfate and separating the same from the ferric sulfate solution, calcining the zinc sulfate, subjecting the zinc and lead compounds separately to the usual metallurgical treatment, and using the regenerated ferric solution for the treatment of a further quantity of ore, and also utilizing the acid fumes, evolved from the aforesaid calcining of the zinc sulfate in the conversion by oxidation of the subsequently formed ferrous sulfate to ferric sulfate.

In testimony whereof I affix my signature in presence of two witnesses.

GUY DE BECHI.

Witnesses:
J. SELLY WARDLE,
WALTER J. SKERTEN.

It is hereby certified that in Letters Patent No. 880,775, granted March 3, 1908, upon the application of Guy de Bechi, of London, England, for an improvement in the "Treatment of Complex Sulfid Ores," an error appears in the printed specification requiring correction, as follows: In line 15, page 1, after the word "lead" the word *and* should be inserted; and that the said Letters Patent should be read with this correction therein that the same may conform to the record of the case in the Patent Office.

Signed and sealed this 24th day of March, A. D., 1908.

[SEAL.]

C. C. BILLINGS,
*Acting Commissioner of Patents.*